United States Patent [19]
Taguma

[11] Patent Number: 4,893,915
[45] Date of Patent: Jan. 16, 1990

[54] BACK MIRROR DEVICE FOR VEHICLE

[76] Inventor: Kunito Taguma, 2361 East Manoa Rd., Honolulu, Hi. 96822

[21] Appl. No.: 259,057

[22] Filed: Oct. 18, 1988

[51] Int. Cl.$^4$ ................................................ G02B 5/08
[52] U.S. Cl. .................................... 350/606; 350/600
[58] Field of Search ............... 350/600, 605, 606, 618, 350/622

[56] References Cited
U.S. PATENT DOCUMENTS 3,463,578  8/1969  Smith .................................. 350/622
3,915,562  10/1975  Ermlich .............................. 350/622
4,120,566  10/1978  Sanci et al. ......................... 350/622

Primary Examiner—Bruce Y. Arnold
Assistant Examiner—J. Ryan
Attorney, Agent, or Firm—Fleit, Jacobson, Cohn, Price, Holman & Stern

[57] ABSTRACT

An upwardly projecting housing is provided in a portion of the ceiling of a vehicle slightly ahead of a front seat. A transparent window is provided at the rear end of housing. A transversely elongate back mirror is mounted on the inner side of a front wall of the housing.

1 Claim, 1 Drawing Sheet

BACK MIRROR DEVICE FOR VEHICLE

BACKGROUND OF THE INVENTION

1. Field of the Invention

This invention relates to a back mirror device for a vehicle and, more particularly, to a back mirror device for vehicle, which provides an increased range of the backward sight in the width direction of the vehicle and can dispense with any side back mirror.

2. Prior Art

Heretofore, back mirrors of a vehicle for confirming vehicles and autobikes running behind the vehicle consist of a pair of side back mirrors extending outwardly from the opposite sides of the vehicle slightly ahead of a front seat and a transversely elongate inside back mirror provided at a position forwardly and upwardly of the front seat.

However, the usual side back mirror is obstructive for it projects outwardly from the vehicle, and it is liable to give rise to an accident of contact with a passers-by or an approaching vehicle on a narrow road. Besides, the side back mirror has a narrow slight range.

Further, the transversely elongate inside back mirror provided forwardly and upwardly of the front seat reflects a rearward image outside the vehicle that is incident through a rear window glass at a rear seat. Therefore, the backward scene that is reflected may be obstructed by the head of a passenger who is seated in the rear seat. Further, the effective sight line connecting the rear window glass and inside back mirror has a inclination angle, so that it is impossible to see the backward scene down to the rear portion of the vehicle. Still further, although the narrowness of the backward slight range is covered by using the side back mirrors and inside back mirror in combination, when paying attention in the backward direction each side back mirror and inside back mirror have to be looked at alternately, so that it is liable that the driver momentarily neglects the attention in the forward direction.

The invention has been intended in the light of the problems discussed above inherent in the prior art vehicle back mirrors, and it is predicated in a consideration that the above problems could be solved by providing an upwardly projecting housing in a portion of the ceiling of the vehicle slightly ahead of a front seat, providing a transparent window at the rear end of the upwardly projecting housing and providing a transversely alongate back mirror on the inner side of a front wall of the upwardly projecting housing.

Specifically, the primary ofject of the invention is to provide a back mirror device for vehicle, which provides an increased backward sight range in the width direction of the vehicle.

A second object of the invention is to provide a back mirror device for a vehicle, which can extend the backward sight range down to a position at a considerably low level.

A third object of the invention is to provide a back mirror for vehicle, which despenses with any side back mirror extending outwardly from a side of the vehicle and is free from an accident of contact with a passer-by or an approaching vehicle on a narrow road.

A fourth object of the invention is to provide a back mirror device for a vehicle, which permits confirmation of the backward scene without possibility of neglecting attention in the forward direction by merely looking at a single back mirror.

The above and other objects and novel features of the invention will become more apparent when the following detailed description of the preferred embodiments is read with reference to the accompanying drawings, it being construed, however, that the drawings are provided for the purpose of illustration only and without any sense of limiting the scope of the invention.

DETAILED DESCRIPTION OF THE PREFERRED EMBODIMENTS

Figure 1:
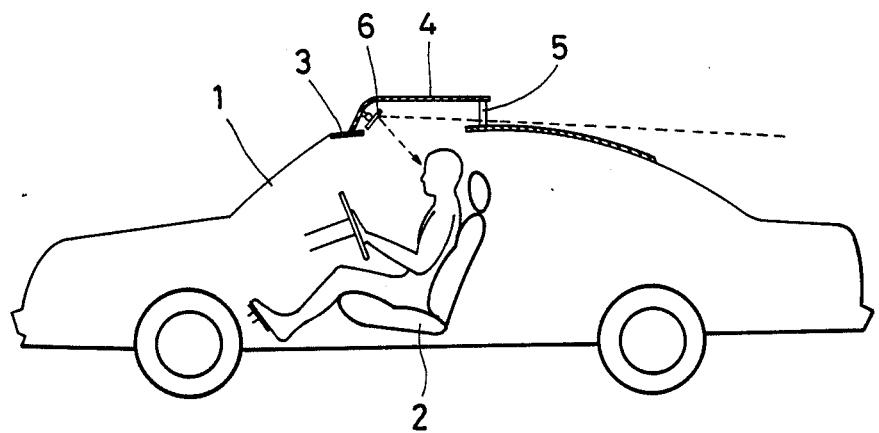
FIG. 1 is a schematic sectional view showing an embodiment of the back mirror device for an automobile according to the invention.

As shown in FIG. 1, a portion of the ceiling 3 of an automobile 1 slightly ahead of a front seat 2 is formed into an elongate, upwardly projecting housing 4 elongate in the width direction of the vehicle.

The upwardly projecting housing 4 may be formed by deep press drawing. Alternatively, a rectangular opening or window may be formed in a portion of the ceiling 3, and a press-formed upwardly projecting housing 4 may be provided at the opening or window by means of welding.

The rear end of the upwardly projecting housing 4 may be made to be a transparent window 5 of glass or a plastic material. A transversely elongate back mirror 6 capable of angle adjustment in the vertical and lateral directions is provided on the inner side of a front wall of the upwardly projecting housing 4.

In the embodiment of FIG. 1, in which the transversely elongate back mirror 6 is provided on the inner side of the front wall of the upwardly projecting housing 4, the driver's eyesight toward the back mirror 6 has a considerable upward angle. Therefore, the driver 6 moves the eyes or the faces upwardly when looking at the back mirror 6. This means that it is possible that the driver momentarily neglects the attention in the forward direction.

Figure 2:
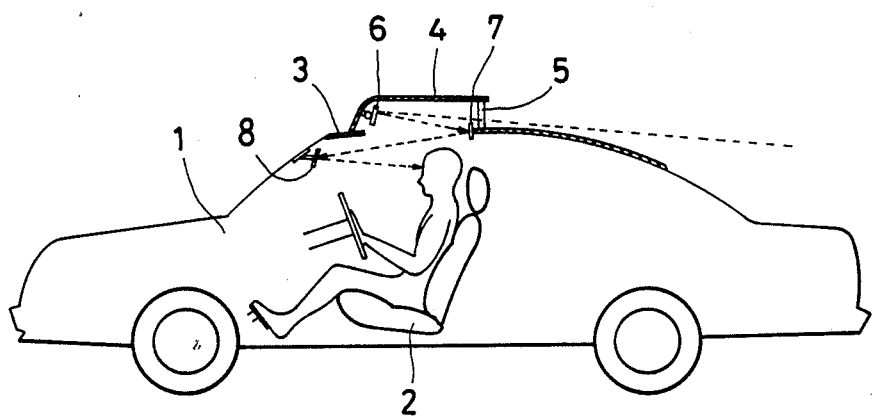
FIG. 2 is a schematic sectional view showing a different embodiment of the back mirror device according to the invention.

FIG. 2 shows a secong embodiment which is provided to solve this problem. In this instance, a mirror 7 is provided on a lower portion of the transparent window 5 at the rear end of the upwardly projecting housing 4 such that it faces the back mirror 6, and a transversely elongate back mirror 8 is provided alightly ahead of the front seat 2 and at a level slightly higher than the driver's eyesight in the forward direction.

In this case, the driver need not substantially tilt the eyes of face upward when looking at the back mirror 8.

As has been described in the foregoing, with the back mirror device according to the invention, the back mirror in the vehicle is provided in a housing at a higher level than the ceiling of the vehicle so that the driver can see the backward image transmitted through the transparent window at the rear end of the housing and reflected by the back mirror. Thus, it is possible to cover a wide transversal range of the backward sight reflected by the back mirror. In addition, the backward sight can be extended up to a position at a considerably lower level. Thus, the side back mirror which is readily liable to give rise to a contact accident can be dispensed with. In addition, since it is necessary to look at a single back mirror for confirming the backward image, there will arise no possibility of momentarily negecting the attention in the forward direction.

It will be obvious that various changes and modifications in the details of the embodiments will be made without departing from the scope and spirit of the invention, and the invention is not mimited except for the limiations as set forth in the claims.

What is claimed is:

1. A back mirror device in a vehicle comprising a rectangular, upwardly projecting housing elongate in the width direction of the vehicle and provided as a portion of the ceiling of the vehicle slightly ahead of a front seat, a transparent window provided at the rear end of said upwardly projecting housing, and a mirror means for reflecting images received through said window to an occupant of the front seat, said mirror means consisting entirely of a transversely elongate back mirror provided on the inner side of a front wall of said upwardly projecting housing and capable of angle adjustment in the vertical and lateral directions said mirror being positioned for reflecting images received through said window directly to the occupant of the front seat when the occupant looks into the mirror.

* * * * *